Feb. 26, 1929.
R. L. SKINNER
1,703,788
CLUTCH
Filed Dec. 27, 1926 2 Sheets-Sheet 1
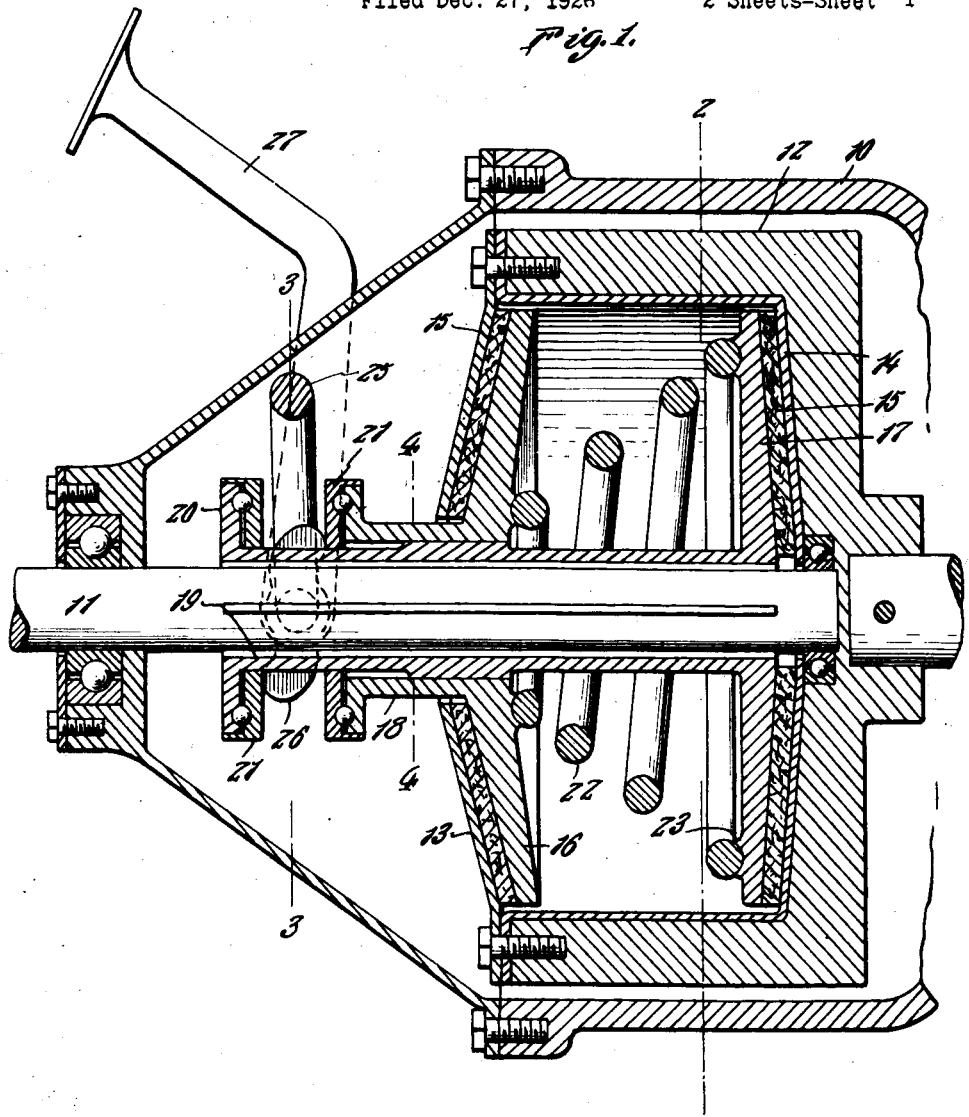
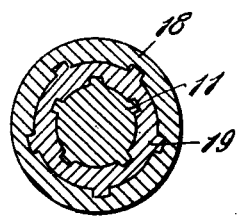
R. L. Skinner
INVENTOR
BY Victor J. Evans
ATTORNEY Feb. 26, 1929.

R. L. SKINNER

CLUTCH

Filed Dec. 27, 1926

R. L. Skinner

INVENTOR

BY Victor J. Evans

ATTORNEY

Patented Feb. 26, 1929.

1,703,788

UNITED STATES PATENT OFFICE.

ROBERT L. SKINNER, OF LIMA, OHIO.

CLUTCH.

Application filed December 27, 1926. Serial No. 157,371.

The invention relates to clutches primarily adapted for use upon motor vehicles embodying among other characteristics an operating mechanism for releasing pressure disks to free the clutch drum while shifting gears.

Another object of the invention comprehends bearing members for the operating mechanism adapted to permit greater ease in the operation of said plates.

A further object of the invention contemplates means carried by the plates adapted for simultaneous operation with a clutch shaft and held against independent rotary movement thereon.

With the above and other objects in view, the invention further consists of the following novel features and details of construction, to be hereinafter more fully described, illustrated in the accompanying drawing, and pointed out in the appended claim.

Figure 1 is a longitudinal sectional view taken through the invention.

Figure 4 is a sectional view taken on line 4—4 of Figure 1 and illustrating the relative association of the plates with the clutch shaft.

Figure 2:
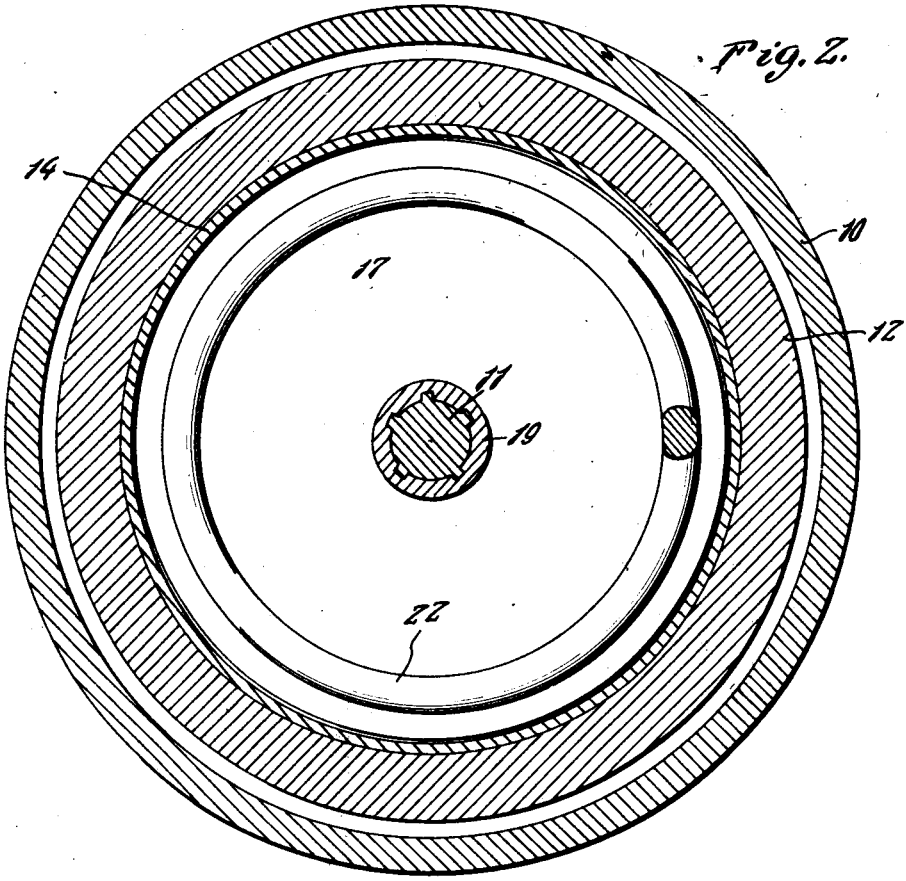
Figure 2 is a sectional view taken on line 2—2 of Figure 1.
Figure 3:
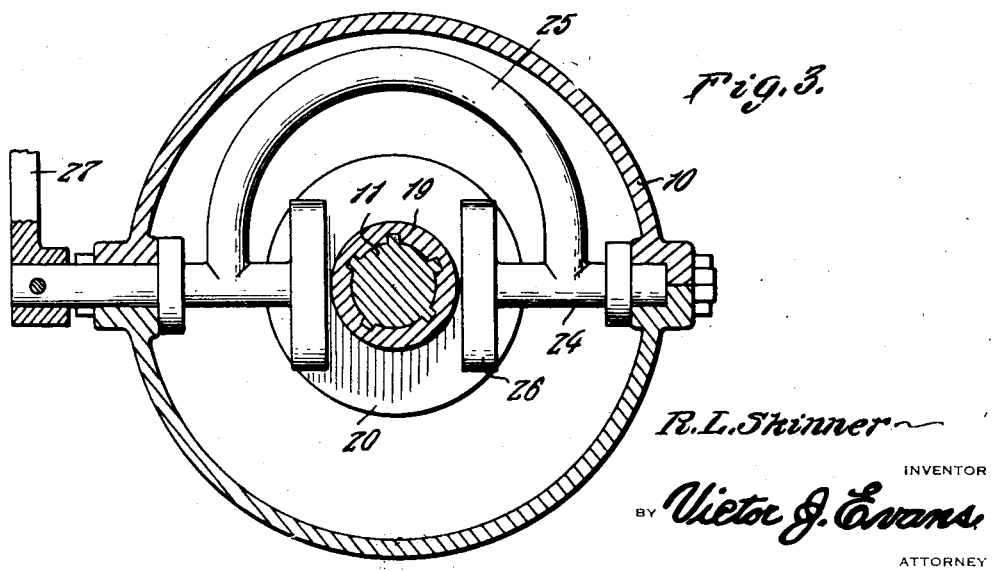
Figure 3 is a sectional view taken through the operating mechanism and on line 3—3 of Figure 1.

Referring to the drawings in detail wherein like characters of reference denote corresponding parts the reference character 10 indicates a housing. A clutch shaft 11 bearingly mounted and disposed axially of the housing has the opposed end thereof journaled within a clutch drum 12. Said drum may be connected with a stub shaft carried by a fly wheel, not shown, or by the adjacent end of a crank shaft extended through the fly wheel. A removable cover plate 13 is provided for the clutch drum 12 and which is concaved substantially as illustrated in Figure 1 of the drawings. A lining 14 for the clutch drum is retained by the cover plate 13. The end wall of the lining 14 is centrally concaved with respect to the cover plate 13 and both the lining 14 and cover plate 13 are faced upon the inner sides thereof with friction disks such as fiber. Said disks are indicated as at 15.

Pressure disks 16 and 17 respectively engage said friction disks and are provided with rearwardly extending telescopically associated sleeves 18 and 19 respectively; the sleeve 19 receives the clutch shaft 11. Said sleeves and the clutch shaft are splined, as illustrated in Figure 4 of the drawings to prevent independent rotary movement of either of the pressure disks upon the clutch shaft. Outwardly extending annular flanges 20 carried upon the ends of the sleeves 18 and 19 are faced upon the inner adjacent sides thereof with thrust bearings 21. A spring 22 is interposed between the adjacent inner sides of the pressure disks 16 and 17 respectively and has the opposed end convolutions thereof fitted within embossed grooves 23 to prevent canting movement of the spring and to assure operation of said disks.

A pedal shaft 24 journaled within the opposed sides of the housing 10 has the intermediate portion thereof cut away and relatively associated with an arch portion 25. Clutch release cams 26 are carried upon the inner portions of the pedal shaft 24 and disposed between the thrust bearings 21. A pedal 27 is carried upon one end of the pedal shaft 24.

In operating the clutch the clutch pedal 27 is depressed, thereby causing the releasing cams 26 to rock and frictionally engage the thrust bearings 21. Such action will cause the annular flanged portions 20 of the sleeves 18 and 19 to be spaced apart. The pressure disks 16 and 17 will be accordingly operated and the spring 22 compressed in order that the friction disks 15 may be released. In such position the transmission for the vehicle may be easily manipulated due to the fact that the strain and forceful effect of the entire motor is released.

The invention is designed for connection with automobiles in the manner as illustrated in the foregoing or may be incorporated with a fly wheel, that is, the clutch housing may be formed within the rear face of a fly wheel.

The invention is susceptible of various changes in its form, proportions and minor details of construction and the right is herein reserved to make such changes as properly fall within the scope of the appended claim.

Having thus described the invention, what I claim as new is:

A clutch comprising a drum, a cover plate therefor of similar configuration to the opposed end wall thereof, friction disks lining the inner sides of the end wall and cover plate, a clutch shaft disposed axially of the plate and drum, pressure disks of configurations similar to the cover plate and end wall being provided with telescopically associated sleeves splined one upon the other and with said shaft, a coil spring encircling the shaft and having the opposed end convolutions thereof engageable with the adjacent sides of the pressure disks, annular flanges carried upon the outer ends of the sleeves, thrust bearings carried thereby, a curved pedal shaft, double cam members oppositely projected from the last mentioned shaft being interposed between the thrust bearings, and a pedal carried by the shaft adapted for operating the pressure disks within the drum out of contacting engagement with the friction disks.

In testimony whereof I affix my signature.

ROBERT L. SKINNER.